March 17, 1931.    M. L. ZIMMER    1,797,066
FILM PROJECTING MACHINE
Filed Feb. 21, 1928    4 Sheets-Sheet 1
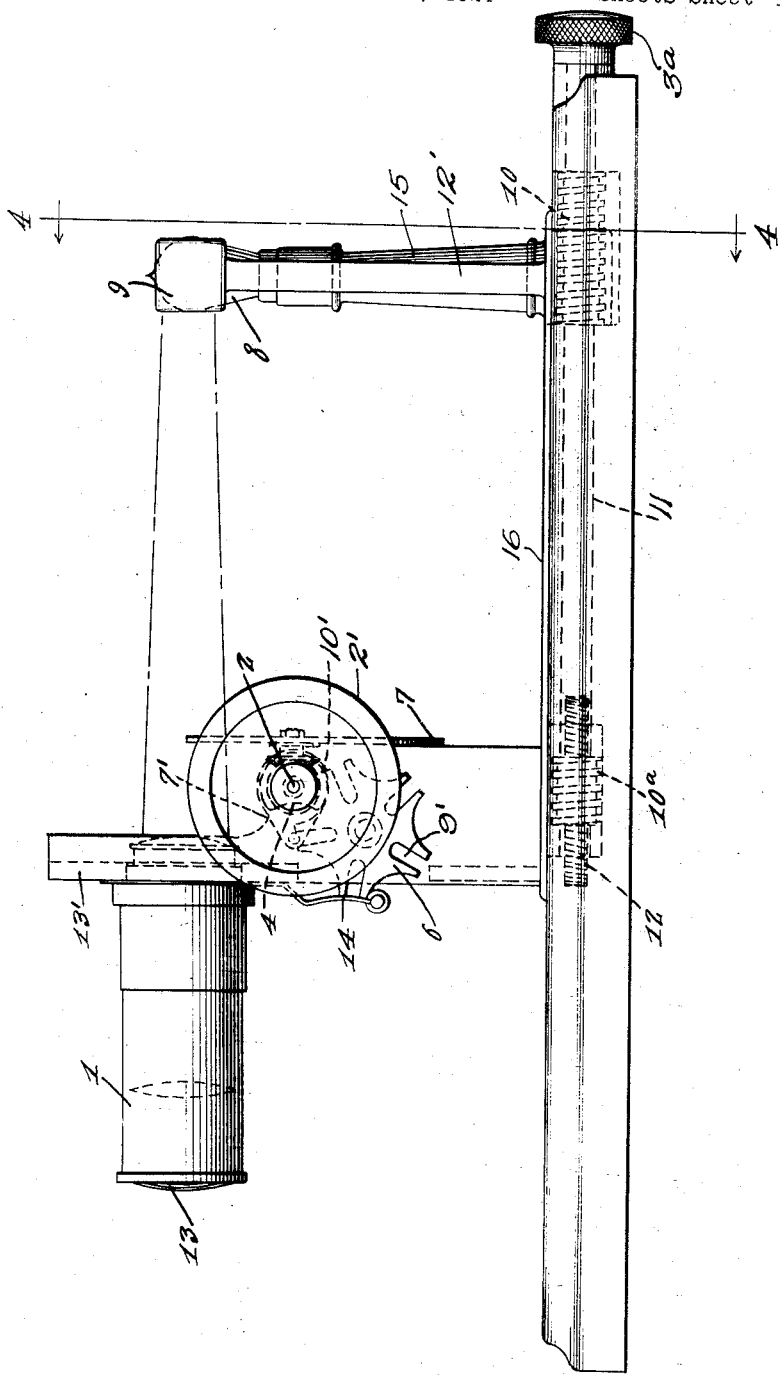
M. L. Zimmer, INVENTOR
BY Victor J. Evans
ATTORNEY March 17, 1931.    M. L. ZIMMER    1,797,066
FILM PROJECTING MACHINE
Filed Feb. 21, 1928    4 Sheets-Sheet 2
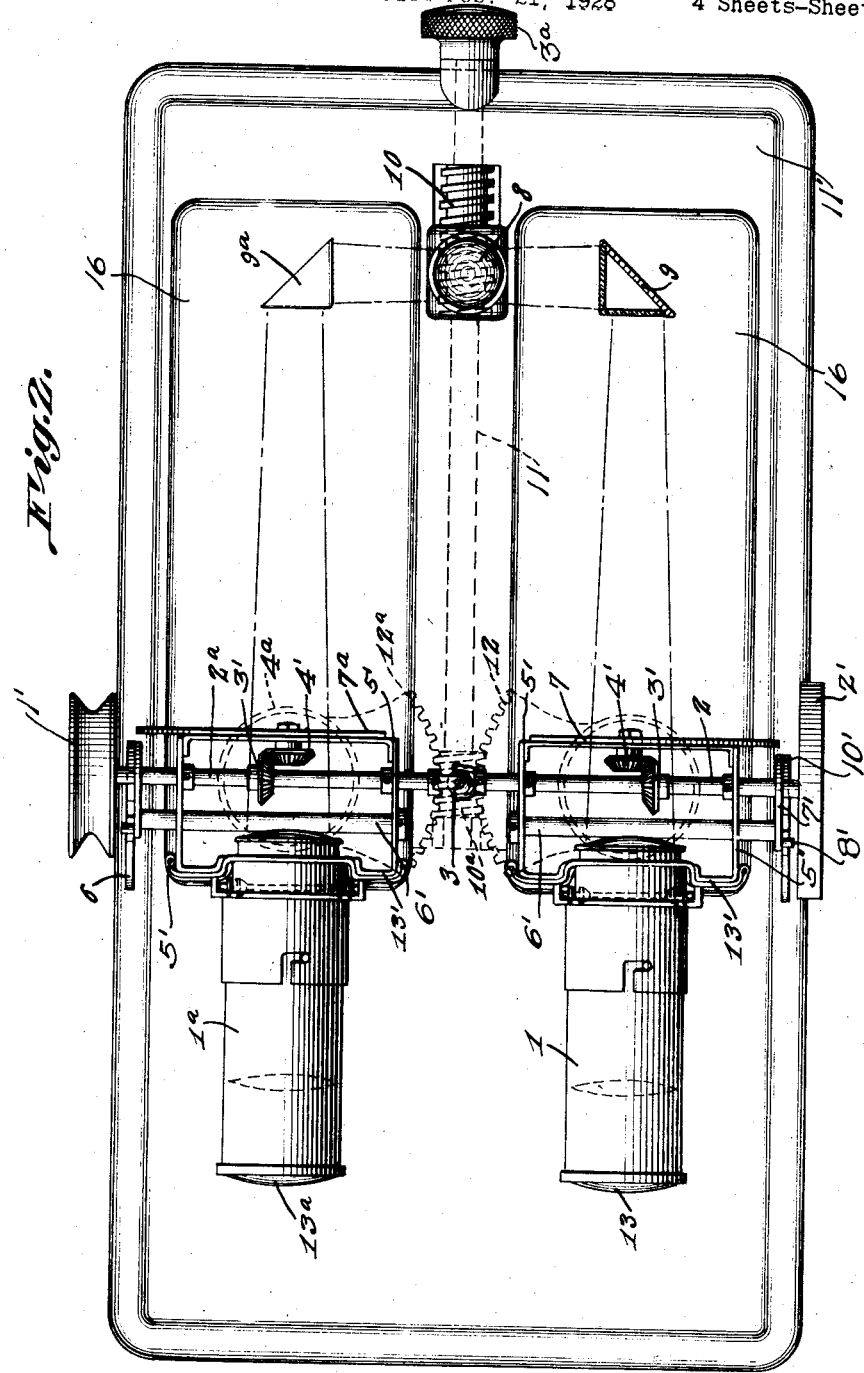

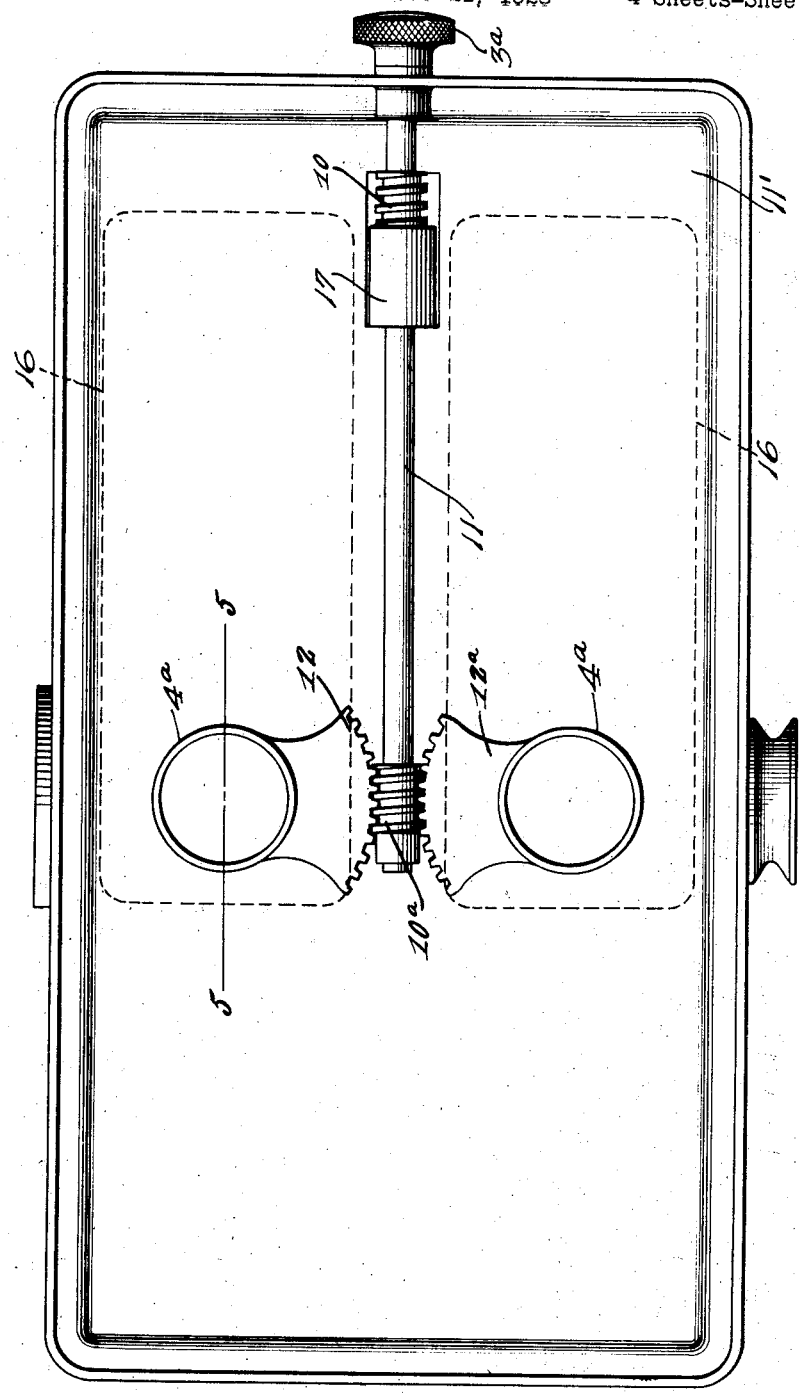

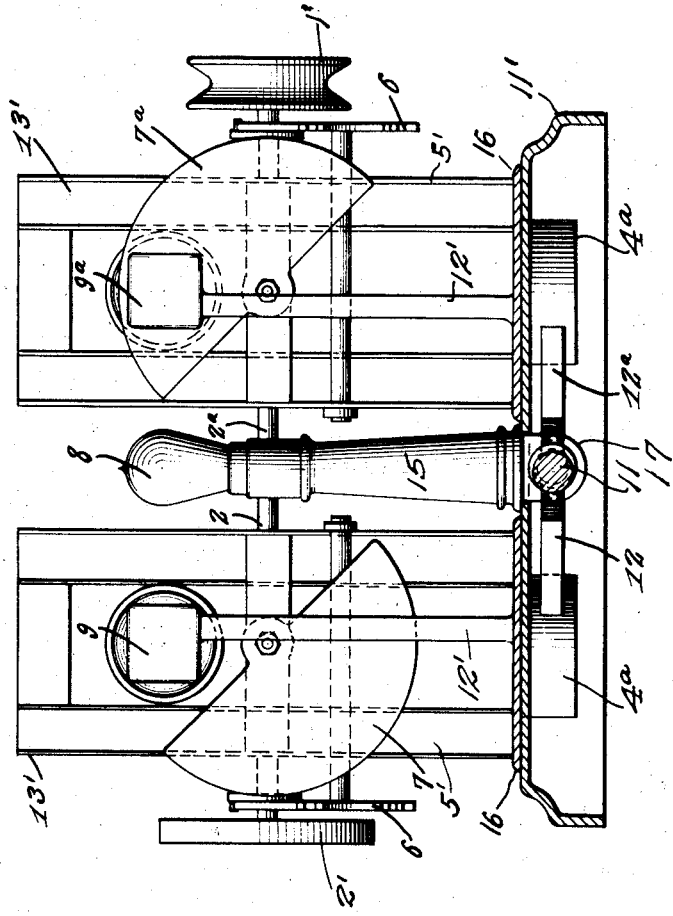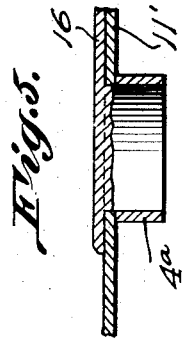

Patented Mar. 17, 1931

1,797,066

UNITED STATES PATENT OFFICE

MEADE L. ZIMMER, OF CORDOBA, ARGENTINA

FILM-PROJECTING MACHINE

Application filed February 21, 1928. Serial No. 255,980.

This invention relates to moving pictures.

The object of the present invention is to avoid the flicker of light during projection on the screen due to the successive phased pictures. The several phased pictures recorded on a film by a taking camera and a motion picture camera as commonly employed, follow each other at a rate of sixteen per second producing when used for projecting purposes, an intermittent illumination of the screen with a short pause at each phased picture during which the shutter is closed to cut off light from the sensitive film during phase changes. These interruptions of screen lighting cause great eye strain and fatigue to such an extent as to make it impossible for many persons to enjoy moving pictures. I provide means for dispensing with this annoyance by maintaining a constant illuminaton of the screen which I effect by the employment of two projecting illuminating systems placed side by side with means for projecting the several phases of the picture superposed on the same focal point of the screen and drive the shutters of two machines so that during projection both shutters for a part of the time of each phase allow light to pass to the screen, thereby avoiding the flicker due to constant light changes of the phasing stages.

I preferably provide two independent positives of the same film, with the pictures of a series on the films being alternately arranged thereon, and mount the frames or pictures of the films for alternate projection of each phase of the picture, focussing the frames or pictures of each of the films at the same focal point on the screen as well as mounting the shutters so that the periods of allowing transmission of light to the screen overlap at some period of each phase of the picture during the change from one to the other, with the pictures from each film overlapping accordingly.
In carrying out my invention, I employ two independent positives of the same motion picture film, with the pictures of the films alternately arranged thereon in a manner whereby one picture is substituted for another by being superimposed on the screen with respect to each other, the films being operated for intermittent progressive movement by the usual Geneva clutch mechanism or gears commonly employed for that purpose, and for movement through a pair of lens systems or machines disposed in parallelism or placed side by side, for the purpose of producing superposed phased pictures in identical position on the screen, and to provide by drive gearing a motion of two shutters that are shaped and operated, whereby the light rays from the two lens systems are alternately cut off from the screen, but are timed so that the light rays while changing, will constantly retain the screen illuminated at all times, with the result the above arrangemnet of parts will avoid the flicker due to the cutting of light during the change from phase to phase employed by machines now commercially used.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of a projector constructed in accordance with my invention.

Figure 2 is a top plan view of the same.

Figure 3 is a bottom plan view of the projector.

Figure 4 is a sectional view taken approximately on line 4—4 of Figure 1.

Figure 5 is a sectional view taken approximately on line 5—5 of Figure 3.

Referring to the drawings in detail, the reference numerals 1 and 1a indicate a pair of projecting lens systems which may be of the usual construction, and 2 and 2a indicate the sections of a drive shaft connected at their confronting ends through the instrumentality of a universal joint indicated by the reference numeral 3. The drive shaft is provided with a drive pulley 1' at one end thereof, and a balance wheel 2' at its other end as best shown in Figure 2 of the drawings. On each section of the drive shaft is fixed a bevel gear 3' meshing with a bevel gear 4' of identical ratio, and these gears are arranged in cooperating pairs to drive shutters which will be presently described. The sections of the drive shaft are mounted for rotation in the frames 5' as shown in Figure 2, and shafts 6' are likewise mounted in the frames. Secured to the outer ends of the shafts 6' are gears of the Geneva type to produce an intermittent motion to the picture films, so as to provide a dwell, for a part of each phase projection of the light on the screen, and for the remaining periods of each exposure of each phase, effecting a shift of the film to bring the next phase into focus on the screen. This form of intermittent gear is clearly shown in Figure 1 in full and dotted lines, and secured on the sections 2 and 2a are cam arms 7' each having pins 8' eccentrically projecting therefrom and being adapted to engage in any one of a series of slots 9' in the gears 6. Disposed adjacent to the slots are arcuate grooves on the periphery of the gears 6 to cooperate with bosses 10' on the sections of the drive shaft.

The bosses have parts of their periphery cut away to provide arcuate portions indicated by the reference numeral 4, as best shown in Figure 1, and during the rotation of the drive shaft, the arcuate portions of the bosses roll over the grooves in the gear 6, and the pins 8' ride into and out of the slots 9', thereby producing an intermittent motion of the shafts 6' to move the films accordingly.

During the dwell of the film, the shutters which are indicated by the reference numerals 7 and 7a are gradually shifting relatively to the light means, one of the shutters gradually admitting light to the screen while the other excludes it. In order to accomplish this function of the shutters, they are substantially semi-circular in form and mounted whereby the straight sides thereof are parallel with each other as best shown in Figure 4.

A source of light such as an electric lamp is indicated by the reference numeral 8 and this lamp may be shifted relatively to prisms 9 and 9a by a worm 10, through the medium of a knob 3a secured to the outer end of a shaft 11 which carries adjacent its opposite end a worm 10a, the latter engaging the arcuate toothed faces of segmental gears 12 and 12a on which are mounted collars 4a of the frames carrying the projection tubes having the lens systems 1 and 1a secured thereto, and which carry the outer lens 13 and 13a.

Rotation of the knob 3a moves the shaft 11 which is mounted longitudinally of the base 11' of the machines, and such rotation enables the lamp to be shifted into and out of relation with respect to the prisms 9 and 9a which are designed for directing the beam from the light forwardly to the respective lens systems as shown in Figure 2 of the drawings. The same movement simultaneously shifts the lens tubes carrying the lens 13 and 13a as well as other lenses, at various angles with respect to each other, and focuses the light beams through the two lens systems at the same focal point on the screen. The prisms 9 and 9a are mounted on the top of uprights 12' which are disposed upon opposite sides of the lamp pedestal 15, and rising from the base members 16 that are disposed to rest upon the base and which have rising therefrom the frames 5' as best shown in Figure 4. The pedestal is mounted in a sleeve 17 that is provided with a screw thread receiving the thread of the worm 10. I preferably mount the gears in the manner as shown in Figure 2, so that the two shutters rotate in the same direction, and with respect to the prisms, so that during a certain period of each phase of projection, one and then the other of the films will be shedding light upon the screen in an alternative manner, due to the fact that the frames or pictures are disposed on the films alternately with respect to each other.

In other words, frame number one would be on one film, frame number two on the other, frame member three on the first film, four on the second etc., but the screen is at all times illuminated and a picture is on the screen before a previous picture leaves the same, the arrangement being such that one picture momentarily overlaps the other, therefore the illusion will be more perfect than the systems now employed, and will not be accompanied by the disagreeable flicker and eye strain commonly experienced.

I have not deemed it necessary to illustrate in detail, the structural features of the film feeding apparatus such as the sprocket drums which cooperate with the consecutive notches in the edges of the films, as they may be of the usual construction. The films may be carried through the zone of illumination in the manner as now employed. The films are shifted over guide posts 13' of the frames 5' and through the film gates of the tubes carrying the lenses, the films being held on the drums by springs 14 as shown in Figure 1.

While in the conventional type of projector, the film is passed through the film gate at approximately a speed of sixteen frames a second, it will be obvious that by arranging the frames as above set forth, namely alternately on each film, with each film including a series of the pictures, the films can be run at a speed to pass eight frames in a second through the respective film gates of the pairs of lens systems shown and accomplish efficient, clear and accurate projection, with the result sixteen pictures can be projected on the screen in a second.

However any speed can be maintained as vibration can be practically eliminated by the rigid parts and substantial bracing means, therefore the lens systems can be retained in true adjusted position with respect to each other at all times.

Having thus described my invention, what I claim as new and desire to secure by Letters Patent is:—

1. A motion picture projector comprising a base, a shaft mounted longitudinally of said base and provided with worms secured thereto adjacent each end thereof, a sleeve interiorly threaded for meshing with the thread of one worm, a pedestal rising from the sleeve, a lamp supported by the pedestal, base members resting upon the base, uprights rising from the base members, prisms supported on the upper ends of the uprights with one prism for each upright, said prisms being disposed upon opposite sides of the lamp for receiving rays therefrom accordingly, segmental gears having arcuate toothed faces meshing with the other worm, frames mounted for rotation and rising from the base members, collars included in said frames, said collars having the segmental gears secured thereto, a lens carrying tube for each frame, and a knob secured to said shaft for rotating the latter to adjust the lens carrying tubes with respect to each other and the lamp with respect to the prisms.

2. A motion picture projector comprising a base, a pedestal extending through said base and rising therefrom, a lamp supported by said pedestal, base members resting upon the base, uprights rising from said base members, prisms supported by the upper ends of said uprights upon opposite sides of the lamp, frames rising from said base members, lens carrying tubes carried by said frames and arranged in the path of the rays of light from the prisms, means for partially rotating the frames for adjusting the tubes with respect to the rays from the prisms, means for adjusting the lamp with respect to the prisms through the medium of the pedestal, both of said means being actuated simultaneously, a drive shaft including connected sections, one for each frame, a bevel gear secured to each section, shutters one for each frame and being mounted for rotation through the rays of lights from the prisms, bevel gears for rotating said shutters and secured thereto and meshing with the bevel gears first mentioned, and said shutters being substantially semi-circular and arranged whereby the straight edges thereof are in parallelism with each other.

In testimony whereof I affix my signature.

MEADE L. ZIMMER.